(12) United States Patent
Neet

(10) Patent No.: US 7,432,626 B2
(45) Date of Patent: Oct. 7, 2008

(54) DYNAMOELECTRIC MACHINE HAVING REDUCED MAGNETIC NOISE AND METHOD

(75) Inventor: Kirk Neet, Saline, MI (US)

(73) Assignee: Remy International, Inc., Anderson, IN (US)

( * ) Notice: Subject to any disclaimer, the term of this patent is extended or adjusted under 35 U.S.C. 154(b) by 482 days.

(21) Appl. No.: 11/346,902

(22) Filed: Feb. 3, 2006

(65) Prior Publication Data

US 2007/0182267 A1    Aug. 9, 2007

(51) Int. Cl.
*H01K 1/00* (2006.01)

(52) U.S. Cl. .................. 310/180; 310/179; 310/198; 310/207

(58) Field of Classification Search .......... 310/180, 310/179, 198, 207
See application file for complete search history.

(56) References Cited

U.S. PATENT DOCUMENTS

| | | | |
|---|---|---|---|
| 5,094,802 A | 3/1992 | Riordan, III | |
| 5,122,705 A | 6/1992 | Kusase et al. | |
| 5,274,322 A | 12/1993 | Hayashi et al. | |
| 5,455,500 A | 10/1995 | Shichijyo et al. | |
| 5,691,590 A | 11/1997 | Kawai et al. | |
| 5,723,930 A | 3/1998 | Ho et al. | |
| 5,977,679 A * | 11/1999 | Miller et al. | 310/164 |
| 5,988,903 A * | 11/1999 | Baitz et al. | 400/605 |
| 5,994,802 A | 11/1999 | Shichijyo et al. | |
| 5,998,903 A | 12/1999 | Umeda et al. | |
| 6,166,471 A | 12/2000 | Kometani et al. | |
| 6,288,471 B1 | 9/2001 | Kometani et al. | |
| 6,414,410 B1 | 7/2002 | Nakamura et al. | |
| 6,417,592 B2 | 7/2002 | Nakamura et al. | |
| 6,433,456 B1 * | 8/2002 | Higashino et al. | 310/263 |
| 6,522,043 B2 | 2/2003 | Masegi | |
| 6,563,247 B2 | 5/2003 | Nguyen | |
| 6,661,146 B2 | 12/2003 | Oohashi et al. | |

(Continued)

FOREIGN PATENT DOCUMENTS

EP     0881752 A1    12/1998

(Continued)

OTHER PUBLICATIONS

European Search Report, Application No. PCT/US2007/002168, Date Mailed Jul. 5, 2007.

(Continued)

*Primary Examiner*—James Harvey
(74) *Attorney, Agent, or Firm*—Cantor Colburn LLP

(57) ABSTRACT

An automotive alternator including a rotor having a plurality of poles; a plurality of phases in operable communication with the plurality of poles; and a stator core in operable communication with the rotor, the stator having a number of slots defined by:

$$S=(P \times PH)+((M \times PH)+N)$$

where S=number of slots
P=number of poles
PH=number of phases
M=a whole integer greater than or equal to 0
N=a whole integer selected from a group of integers ranging from, and including, 1 through the number of phases minus 1.

A method for reducing magnetic noise in an automotive alternator includes selecting a number of poles, selecting a number of phases, selecting a number of stator core slots, the foregoing selections interacting in the automotive alternator to produce an order of frequency of a tangential force different than any multiple of the number of phases and different than an order of frequency of a radial force of the alternator.

28 Claims, 13 Drawing Sheets

U.S. PATENT DOCUMENTS

| | | | |
|---|---|---|---|
| RE38,464 E | 3/2004 | Kusase et al. | |
| 6,784,583 B2 * | 8/2004 | Umeda | 310/179 |
| 6,798,106 B2 | 9/2004 | Nakamura et al. | |
| 7,126,245 B2 * | 10/2006 | Even et al. | 310/179 |
| 2004/0012292 A1 | 1/2004 | Kometani et al. | |
| 2005/0017592 A1 | 1/2005 | Fukushima | |
| 2005/0194857 A1 | 9/2005 | Mori et al. | |
| 2007/0182267 A1 * | 8/2007 | Neet | 310/180 |

FOREIGN PATENT DOCUMENTS

| | | |
|---|---|---|
| EP | 1 120 884 B1 | 10/2005 |
| JP | 11252841 | 9/1999 |
| JP | 2002315284 | 10/2002 |
| JP | 2004023950 | 1/2004 |

OTHER PUBLICATIONS

International Search Report with Written Opinion, Application No. PCT/US2007/002168, Date Mailed Nov. 14, 2007.

* cited by examiner

DYNAMOELECTRIC MACHINE HAVING REDUCED MAGNETIC NOISE AND METHOD

BACKGROUND OF THE INVENTION

Dynamoelectric machines are integral portions of many modern day assemblies including such things as automobiles. One type of a Dynamoelectric machine, known as an automotive alternator, converts mechanical energy produced by one source into electrical energy to be used as desired by the automobile. An automotive alternator is defined as any dynamoelectric machine, which converts mechanical energy into electrical energy to be used as desired by an automobile. While such desires are useful, the magnetic noise associated with the generation of the electrical energy is undesirable. For reasons well known to those of ordinary skill in the art, a stator core of a dynamoelectric machine is one of: 1) full pitch, i.e. the number of slots is equal to the number of phases of the machine multiplied by the number of poles of the machine; and 2) fractional pitch, i.e. the number of slots is a multiple of the number of phases of the machine. The present inventor has apprehended that in both configurations, radial forces and tangential forces of the operating machine combine to create a large force leading to undesirable magnetic noise from the machine.

Dynamoelectric machines capable of operating more quietly would be well received by the art.

SUMMARY OF THE INVENTION

Disclosed herein is an automotive alternator including a rotor having a plurality of poles; a plurality of phases in operable communication with the plurality of poles; and a stator core in operable communication with the rotor, the stator having a number of slots defined by:

$$S=(P \times PH)+((M \times PH)+N)$$

where S=number of slots
P=number of poles
PH=number of phases
M=a whole integer greater than or equal to 0
N=a whole integer selected from a group of integers ranging from, and including, 1 through the number of phases minus 1.

Further disclosed herein is an automotive alternator including a stator, a rotor in operable communication with the stator, at least one conductor having a plurality of endloops and a plurality of slot segments, and an unusual number of slots formed in the stator, the slots including at least one slot populated by a number of slot segments different than a number of slot segments populating another of the slots.

Yet further disclosed herein is a method for reducing magnetic noise in an automotive alternator. The method includes selecting a number of poles, selecting a number of phases, selecting a number of stator core slots, the foregoing selections interacting in the automotive alternator to produce an order of frequency of a tangential force different than any multiple of the number of phases and different than an order of frequency of a radial force of the alternator.

BRIEF DESCRIPTION OF THE DRAWINGS

Refer to the drawings wherein like elements are numbered alike in the several figures.

DETAILED DESCRIPTION

Figure 1:
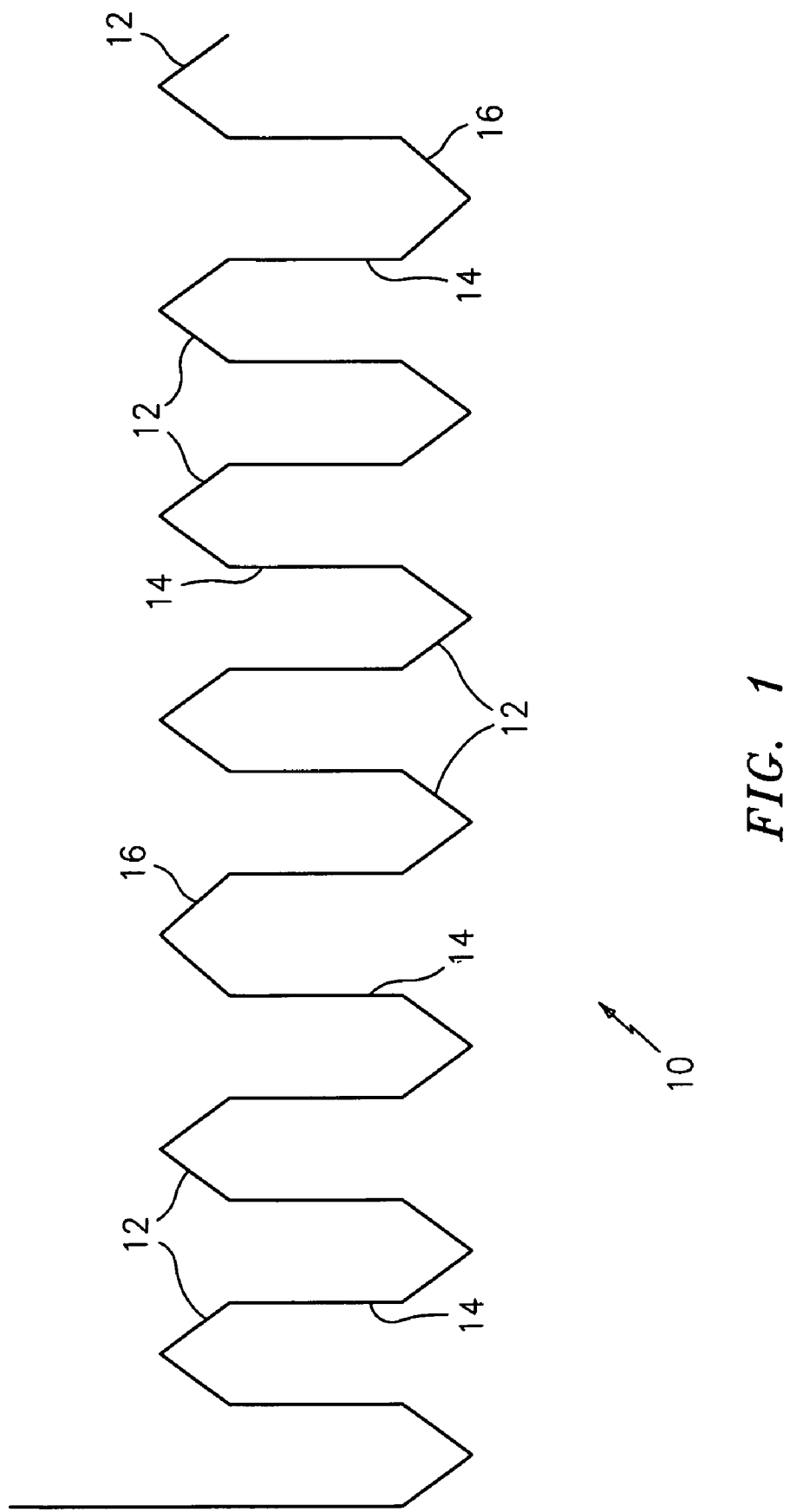
FIG. 1 is a schematic illustration of a conductor enabling the slot configuration as disclosed herein.

In order to combat the magnetic noise in dynamoelectric machines for use in more modern applications where the noise is problematic for consumer satisfaction, component interaction, etc. the present inventor has departed from the conventional wisdom of the full pitch and fractional pitch stator cores. The reasoning behind the departure is a recognition that the tangential force, caused by cogging torque of rotor poles as they pass each stator core tooth is additive with the radial force, caused by torque ripple. The reason these two forces are additive, and therefore combine to form a large force creating magnetic noise, is that for a full pitch winding, they both exhibit the same order of frequency, that is the number of poles times the number of phases and for a typical fractional pitch winding, they both exhibit an order of frequency which is a multiple of the number of phases. To minimize magnetic noise the number of slots in a stator core should be as taught herein, whereby the order of frequency of the tangential force and the order of frequency of the radial force will be as far removed from one another as practicable and preferably both not a multiple of the number of phases. In other words, noise can be reduced if it is ensured through careful selection of the number of poles, phases and slots to interact such that an order of frequency of a tangential force of the resulting alternator is different than any multiple of the number of phases of the alternator and different than an order of frequency of a radial force of the alternator.

The above is achievable in a dynamoelectric machine by selecting a stator core slot configuration defined by:

$$\text{number of slots}=(P \times PH)+((M \times PH)+N)$$

where P=number of poles
PH=number of phases

N=any one of a set of whole numbers inclusive from 1 through the number of phases −1
and M=a whole integer greater than or equal to 0.

As can be seen by the formula, the number of slots can never be equal to the number of phases times the number of poles or even a multiple of the number of phases times the number of poles. A stator is defined has having an unusual number of slots when the number of slots is not equal to, or a multiple of, the number of phases times the number of poles. For example, a stator having 3 phases and 12 poles is defined as having an unusual number of slots when the number of slots is not equal to 36, 72, 108, etc. The typical automotive alternator has three phases or six phases.

One example of a stator core configured as taught herein is one in which M=0 and 85, 86, 87, 88 or 89 slots are utilized with a rotor having 14 poles and the machine including six phases. It will be recognized that such a number of slots does not agree with either a full pitch system or a fractional pitch system. Furthermore, it is desirable to have M=0 so that the number of slots is minimized to reduce winding complexity and to maintain stator slot fill factors (fewer partially filled slots)—this is especially true when the number of slots is already large. The number of slots can be large if the number of phases is large, such as when PH=6 for a dual winding (wye or delta) commonly known to those skilled in the art. The number of slots can also be large when a design common to those skilled in the art is utilized wherein the number of slots equals two times the number of phases times the number of poles—in this case the invention art results in a stator having a number of slots greater than two times the number of phases times the number of poles.

Altering the number of slots in a stator core from the conventional number brings with it certain difficulties regarding installation of windings in the stator. This is because the winding pattern will not begin and end in adjacent slots. For this reason, it is taught herein that particular slots are to be skipped in the winding process. Skipping slots roughly diametrically opposed from one another provides improved spatial balancing of applicable electromagnetic forces.

Because of the skipped slots, industry standard type conductors are not used. Rather conductors having a unique pattern of endloops and slot segments are utilized. Due to the unique pattern of endloops, a hairpin type winding would require numerous shapes of hairpins and therefore, it is desirable, but not necessary, to form the conductor from one continuous conductor as can be seen in FIG. 1. Referring to FIG. 1, one embodiment of a conductor 10 is illustrated. This particular embodiment is configured for an 86 slot stator core. It will be appreciated that there are "normal" endloops 12 interconnected by slot segments 14 and two skip-endloops 16. Although not shown in FIG. 1, the continuous conductor will be inserted into a stator core such that the slot segments 14 are disposed in the core slots. Skip-endloops 16 are intended to enable a slot segment 14 adjacent the skip-endloop 16 to be received in a slot different than the one in which it would have landed had the skip-endloop been a standard endloop. Stated another way, skip-endloops 16 position adjacent slot segments into slots that are farther away from one another than "normal" endloops 12. The term adjacent slot segments, utilized herein, refers to two slot segments, which are attached to the same endloop. Such conductors allow for irregular slot counts to be wound without winding overlap issues. As noted, the FIG. 1 embodiment of conductor 10 is intended for an 86-slot stator core to be operable with a 14 pole rotor and 6 phases. It will be appreciated that such a machine should bear 84 slots if full pitch or a multiple of six slots if fractional pitch. Typically, the number of "normal" endloops 12 greatly outnumbers the amount of skip-endloops 16. This is true because the number of skip-endloops 16 is proportional to the number of additional slots ((M×PH)+N) over the standard number of slots (number of poles×number of phases) and as previously mentioned; it is desirable to minimize the number of slots. Therefore a conductor exhibits (from left to right) a series of at least two consecutive "normal" endloops 12 before having a skip-endloop 16.

While the specific conductor of FIG. 1 is designated for use with an 86 slot stator core, it should be appreciated that machines with 14 poles and 6 phases are not limited to 86 slots to obtain the benefit of the invention. Rather, a 14 pole, 6 phase machine is to possess 85, 86, 87, 88, or 89 slots with M=0 or 91, 92, 93, 94, or 95 slots with M=1 and so forth. Any of these number of slots for a 14 pole, 6 phase machine will achieve the desired reduction in magnetic noise.

Figure 2A:
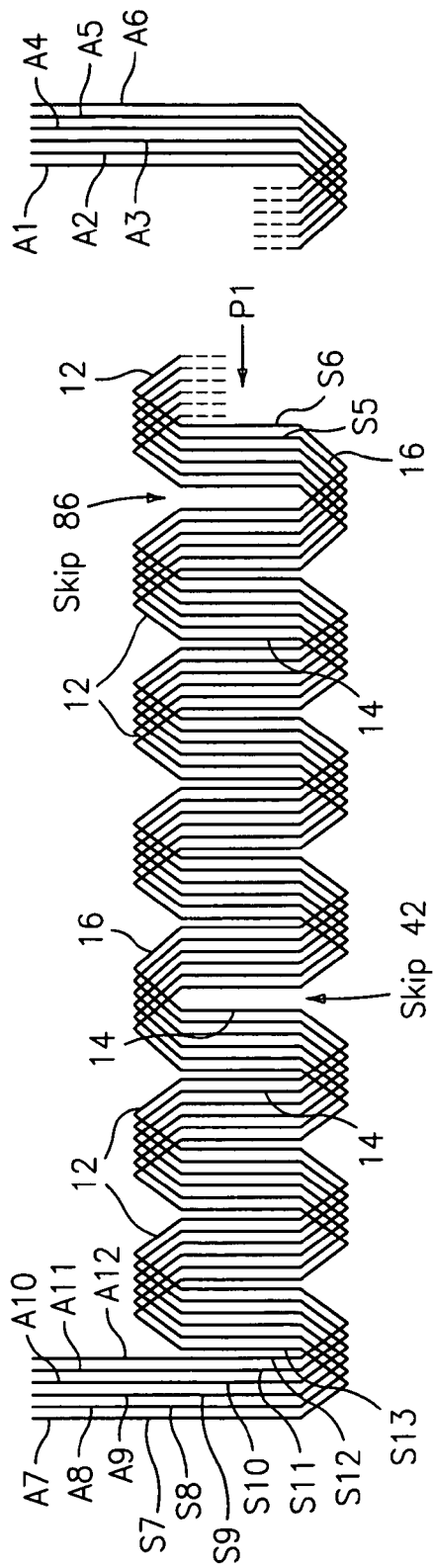
FIG. 2A is a schematic view of a first pass having six phases, each conductor being specially formed as disclosed herein.
Figure 2B:
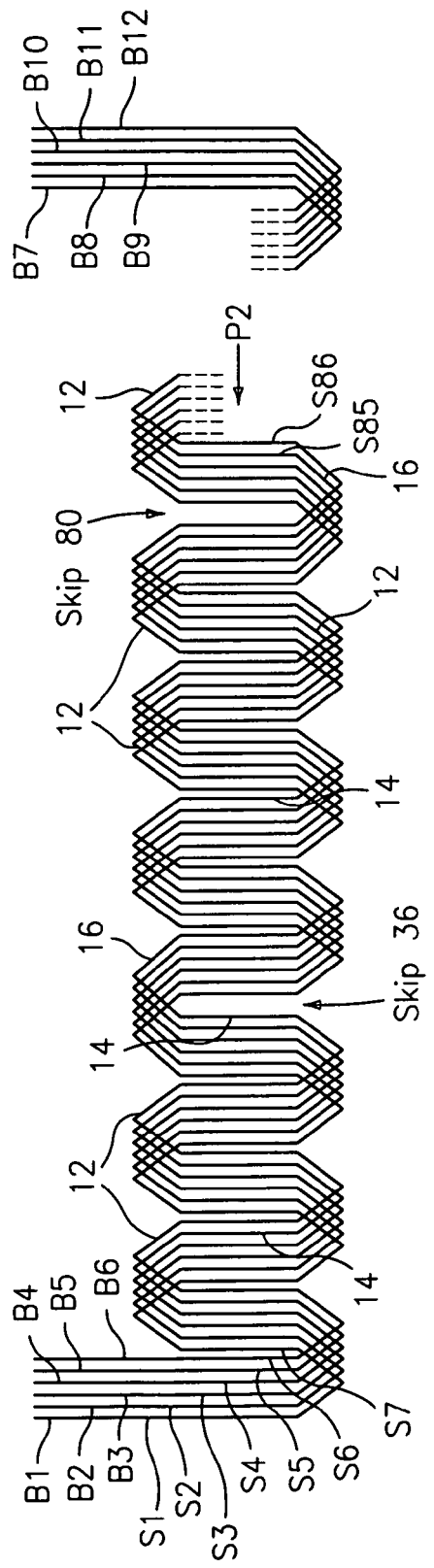
FIG. 2B is a schematic view of a second pass having six phases, each conductor being specially formed as disclosed herein.
Figure 3:
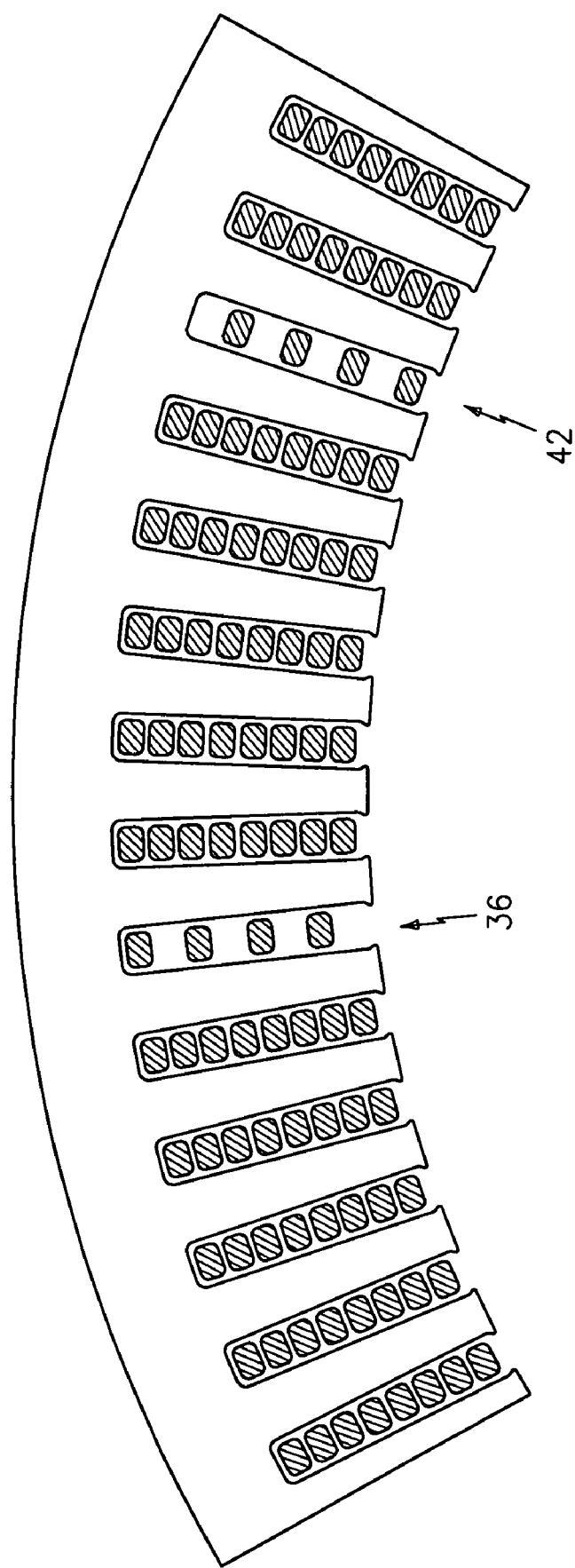
FIG. 3 is another partial cross-sectional view using the winding pattern of FIGS. 2A/2B and where slot 37 and 43 have four conductors each in paired relation.

Referring to FIGS. 2A and 2B and still using the 86 slot example, two winding passes are illustrated, one in each figure. Note that in each figure, there is included a broken line section. This section is intended to represent a duplication of the bending pattern of the conductor illustrated on the left side of the figure. In each case, the bend pattern illustrated is repeated three more times in the broken line section to complete one full length conductor (the same is true for the conductors shown in FIGS. 7A and 7B, treated hereunder). For simplicity, the winding is also shown in FIGS. 2A, 2B, 7A, 7B and 11 to be in a linear state as if they were separated from the core and rolled out flat. Six phases are evidenced by the six conductors illustrated in each figure. The first pass P1 (FIG. 2A), bears conductors having a form identical to that shown in FIG. 1 hereof. The second pass P2 (FIG. 2B) bears a slightly different configuration but which includes identical numerals. It is to be appreciated that the term "skip" is provided on the drawings with lead arrows to indicate where a stator slot exists but is not to be populated by a slot segment 14 during that particular pass. In the embodiment depicted in FIGS. 2A and 2B, slot 43 and 86 are skipped in the first pass P1 and slot 37 and 80 are skipped in the second pass P2. Additional winding passes will repeat the FIG. 2A and FIG. 2B patterns in alternating manner. The schematic view of this winding pattern of FIGS. 2A and 2B can be seen in FIG. 3 after the completion of eight passes. Illustrated in FIG. 3, as a partial cross sectional representation of a stator core, is a configuration wound as in FIG. 2A/2B and where slot 37 and 43 of the stator core are populated by only 4 slot segments each and therefore slots 37 and 43 (as well as slots 80 and 86 not shown in FIG. 3) are populated by fewer slot segments than the rest of the slots, after eight passes.

Figure 4:
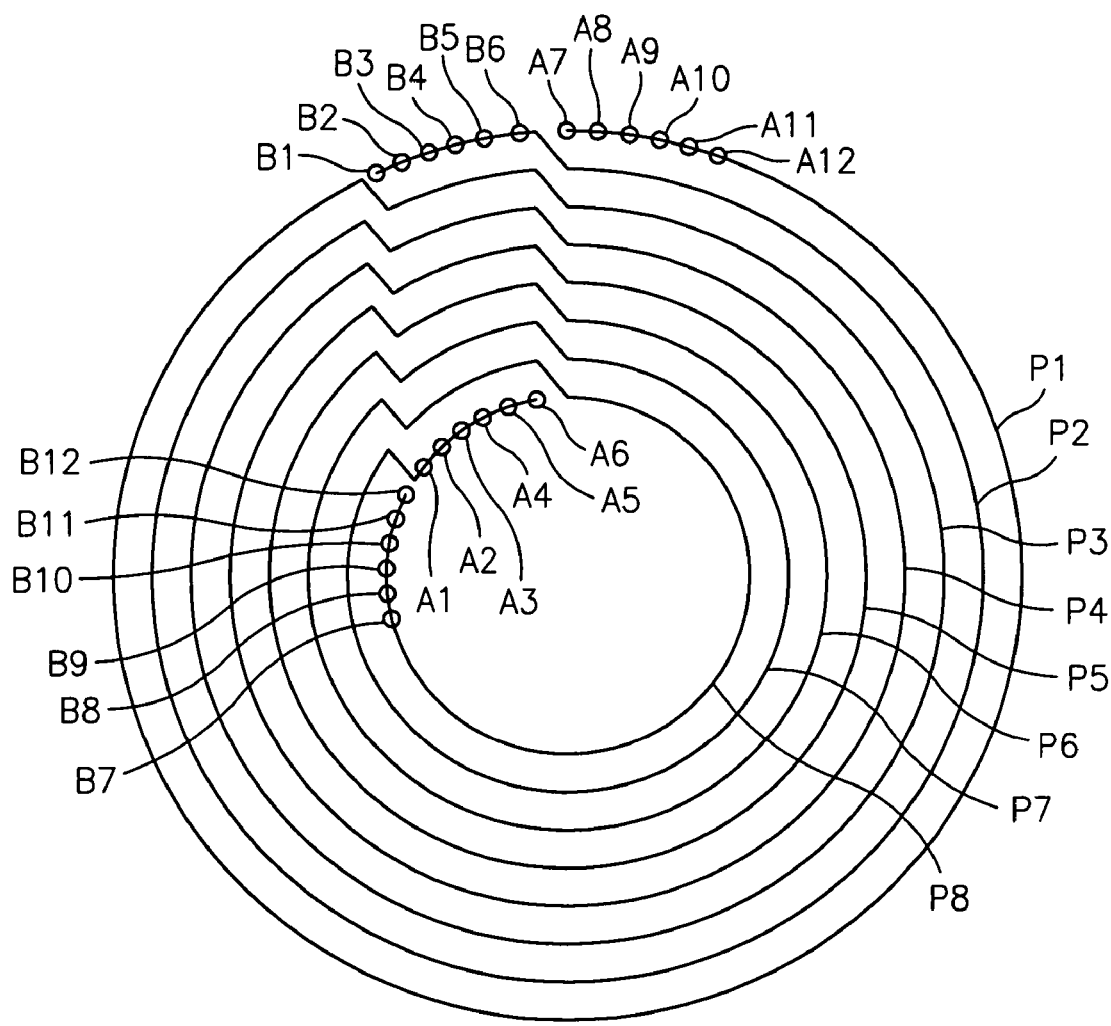
FIG. 4 is a schematic view of a winding pattern.
Figure 5:
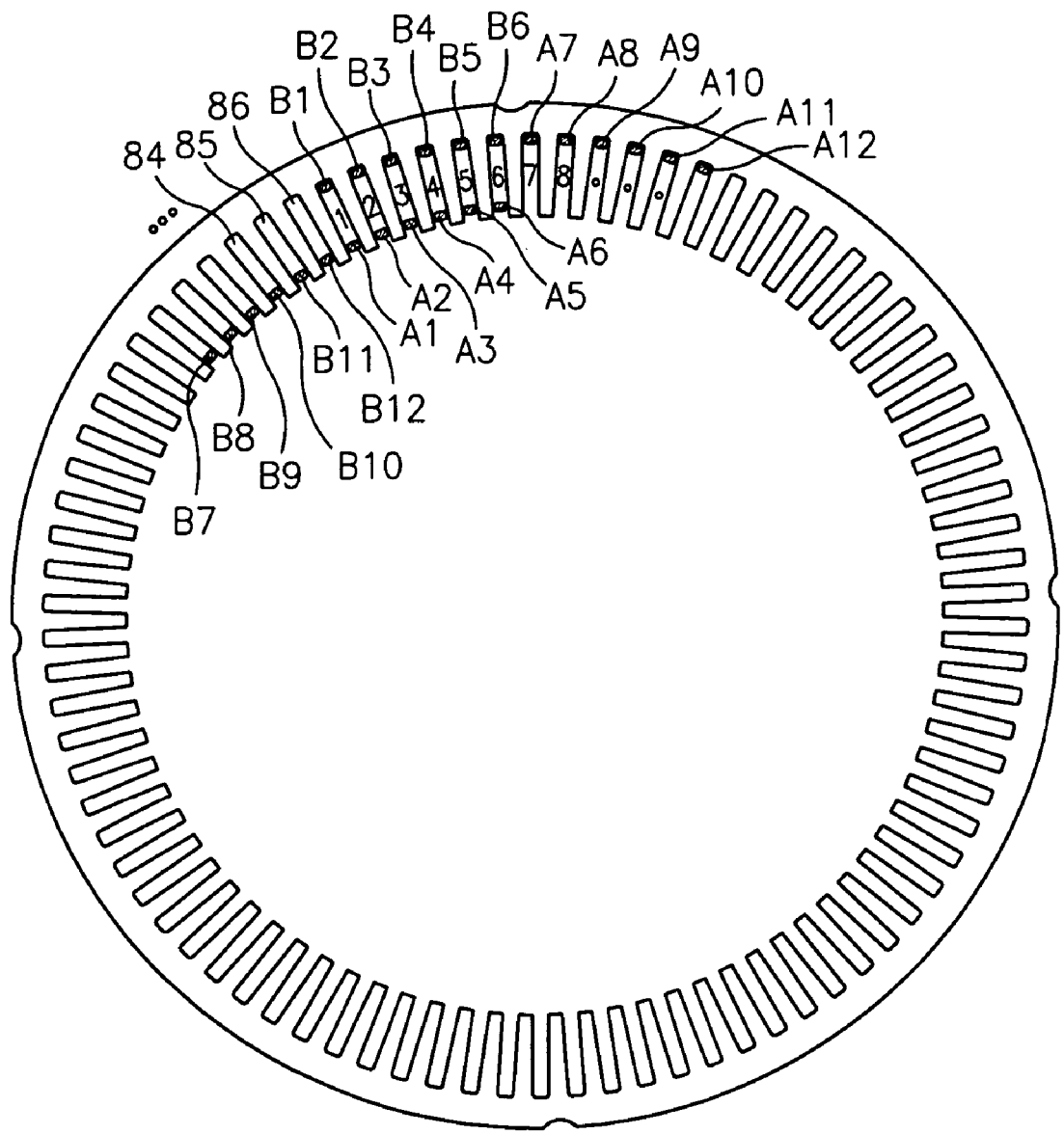
FIG. 5 is an illustration of conductor lead locations in a stator core.

The resulting winding of FIGS. 2A and 2B conductors is further illustrated schematically in FIG. 4 so that the step of each phase of conductors radially inwardly at the end of each pass can be visualized. It is to be understood that P1-P8 are passes. Further, in order to make FIGS. 10A and 10B (discussed hereinafter) clear, each lead on each conductor (each conductor will have two leads) is labeled separately. For example, leads A1 and A7 extend from each end of a single conductor. Similarly, A6 and A12 extend from each end of a single conductor. The same is true for the leads marked with a B prefix. Referring to FIG. 5, and in conjunction with the above disclosure, it will be apparent how the leads and therefore the conductors are received into slots in the stator core.

Figure 6:
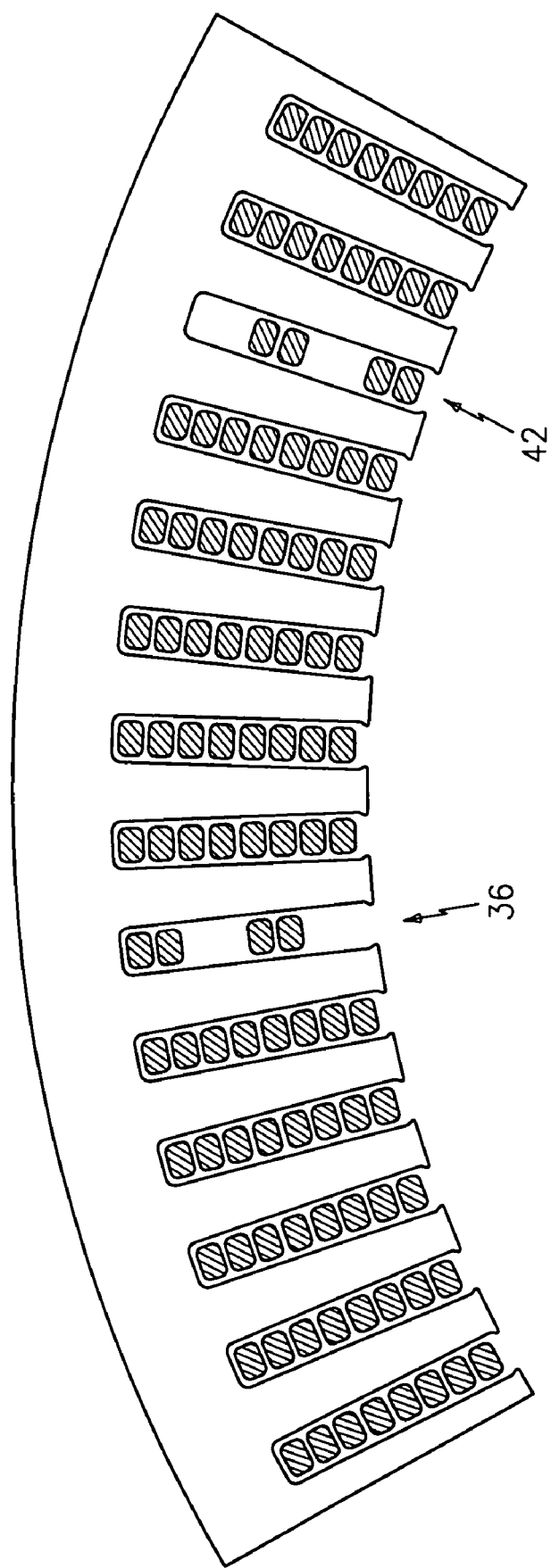
FIG. 6 is a schematic partial cross-sectional view of a stator core populated with conductors according to the winding pattern of FIGS. 2A/2B where slot 37 and 43 include only four conductors grouped into pairs.

Relatedly, FIG. 6 is a partial cross sectional view of an alternate wind pattern wherein the wind pattern of FIG. 2A is repeated twice followed by the wind pattern of FIG. 2B repeated twice, with this pattern repeated until the completion of eight passes. In this embodiment slot 37 and 43 have only 4 slot segments each and the slot segments are grouped in pairs within these slots. The desirability of this pattern is that the slot segments are disposed in the slots 37 and 43 in pairs such that the typical stator varnishing operation would bond the pairs together, creating a more rigid assembly of slot segments in less-populated slots 37 and 43. As shown in the relative position on the drawing sheet of FIGS. 2A and 2B, the second pass may be shifted from the first pass by PH slots, such that the conductors of a particular phase of the second pass are shifted from the conductors of the same phase of the first pass.

Figure 7A:
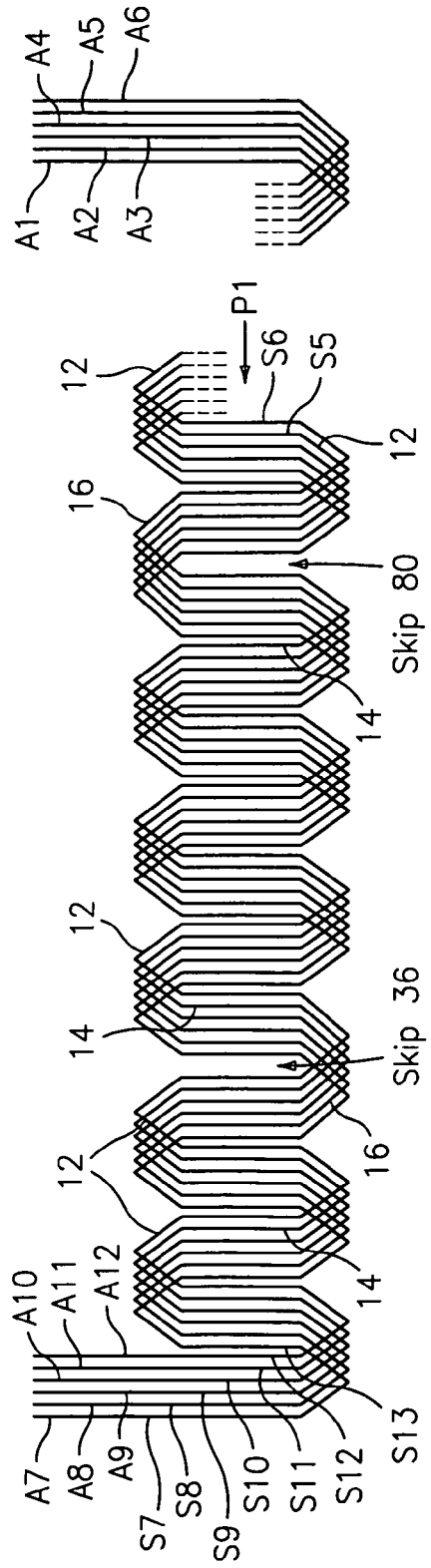
FIG. 7A is a schematic view of a first pass for an alternate winding pattern.
Figure 7B:
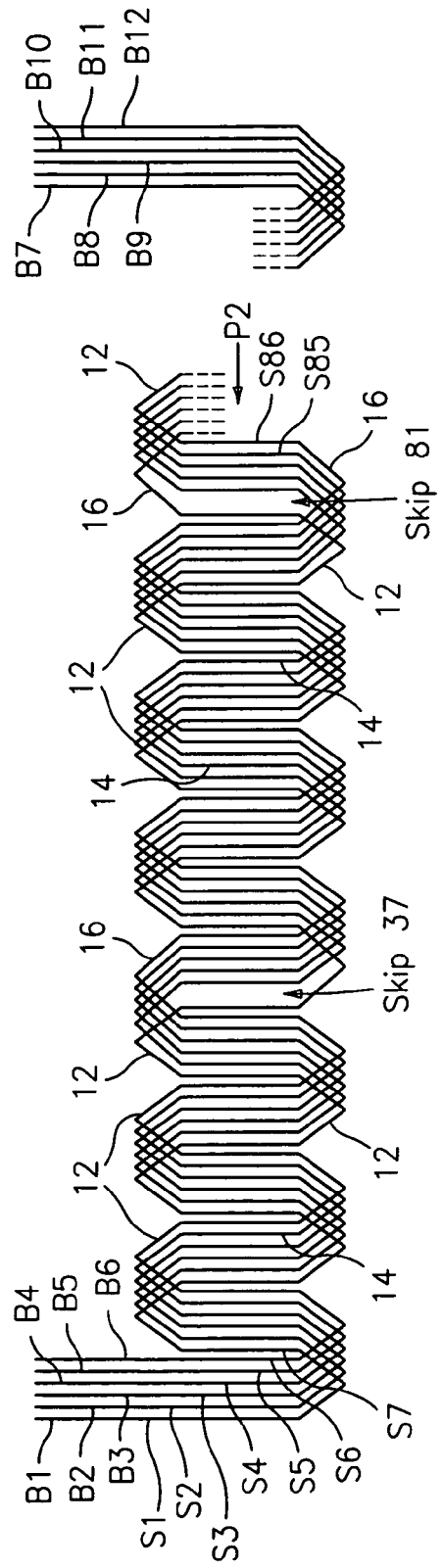
FIG. 7B is a schematic view of a second pass for the alternate winding pattern of FIG. 4A.

In another alternate embodiment, referring to FIG. 7A (again having 86 slots), the first pass is similar to that illustrated in FIG. 2A except that the skip endloops 16 are positioned to cause the conductor to skip slot 37 and slot 80. In the first pass P1, all conductors skip slots 37 and 80. The illustration of FIG. 7B differs from that of FIG. 7A. FIG. 7B presents a distinct second phase P2 conductor from that of FIG. 7A in that the skip endloops 16 are positioned to cause it to populate slot 37 as opposed to slot 38 and slot 80 as opposed to slot 81. In the second pass P2, all conductors skip slots 38 and 81. In this embodiment, as in the FIG. 2A/2B embodiment, first and second passes may alternate or two first passes and two second passes may alternate or any other similar alternating pattern. The desirability of this pattern is ease of manufacturing because only the first phase is disposed in different slots depending on the pass.

Figure 8:
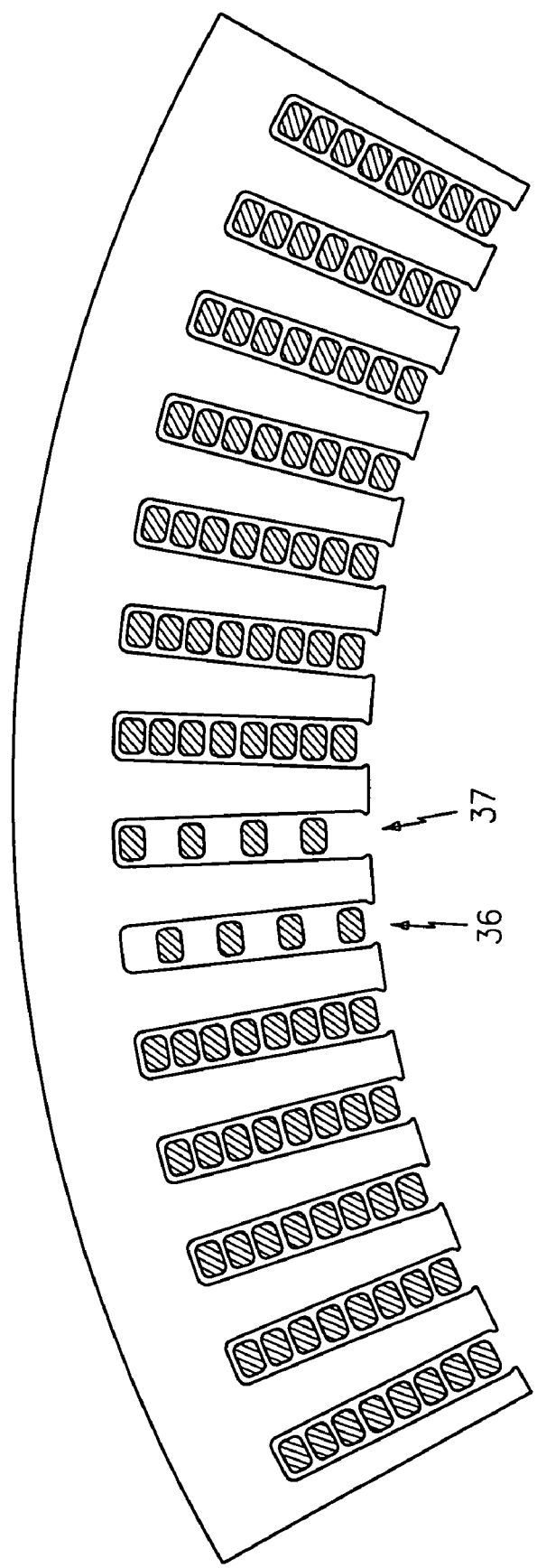
FIG. 8 is yet another alternative winding pattern using the winding of FIGS. 4A/4B where slots 37 and 38 have only four conductors.

Referring to FIG. 8, another embodiment is schematically illustrated wherein the winding pattern of FIGS. 7A/7B are employed where four spaced slot segments are illustrated in slots 37 and 38, after eight passes.

Figure 9:
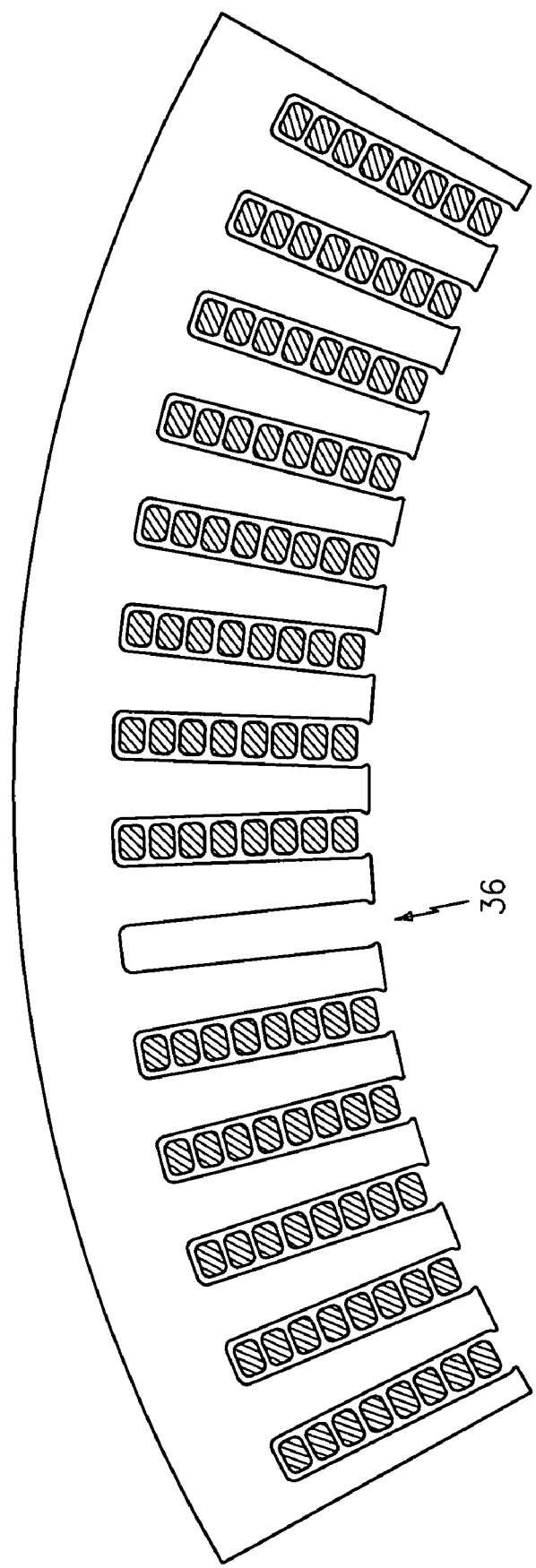
FIG. 9 is another alternative winding pattern where all passes skip the same slot, leaving it empty.

Referring to FIG. 9 yet another alternate winding pattern is illustrated that uses a pattern that is the same for each pass. The pattern for example could be like that of FIG. 7A. Such arrangements will leave two slots, as for example 37 and 80, empty. The desirability of this pattern is ease of manufacturing because all of the conductors of each phase have the same shape (the conductors are the same except shifted one slot from another).

Figure 10:
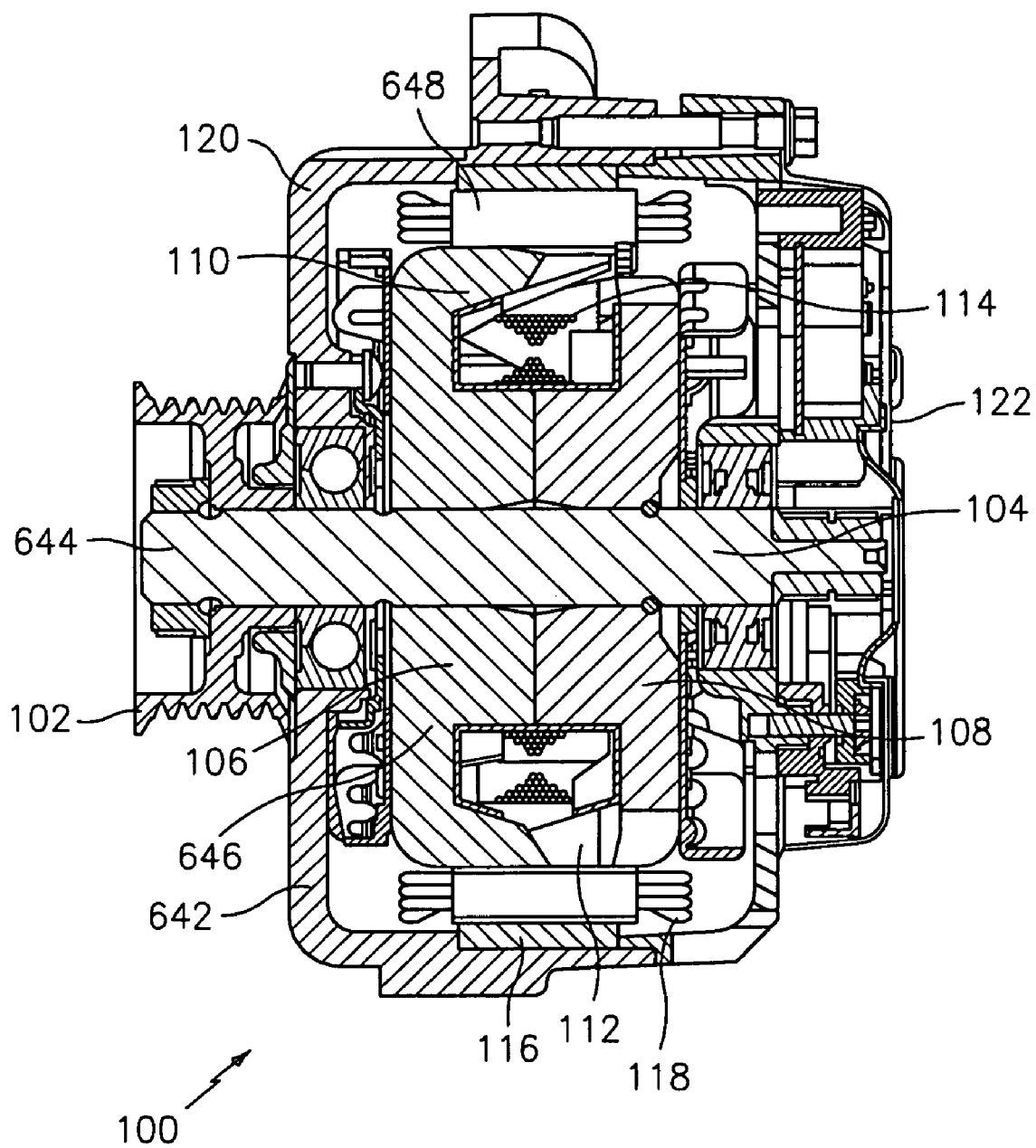
FIG. 10 is a schematic cross sectional view of a prior art alternator.

To ensure clarity in the understanding of the disclosure herein by one less familiar with alternators, reference is made to FIG. 10 wherein a schematic cross-section view of a prior art alternator is illustrated. The alternator 100 includes a pulley 102 connected to a rotor shaft 104 upon which a pair of pole pieces 106 and 108 are rotationally supported. Pole pieces 106, 108 are configured to present a plurality of pole fingers 110, 112 (two visible) circumferentially around the shaft 104. Rotor core windings 114 are positioned between fingers 110/112. The alternator 100 further includes a stator core 116 having a number of slots, the number being of full or fractional pitch, as explained above (not shown) and stator core windings 118 therein. The noted alternator components are supported in position by a front end frame 120 and a rear end frame 122. Portions of the rotor and associated rotating poles create an induced current in the stator core windings, which current is usable as generated electrical energy.

Figure 11:
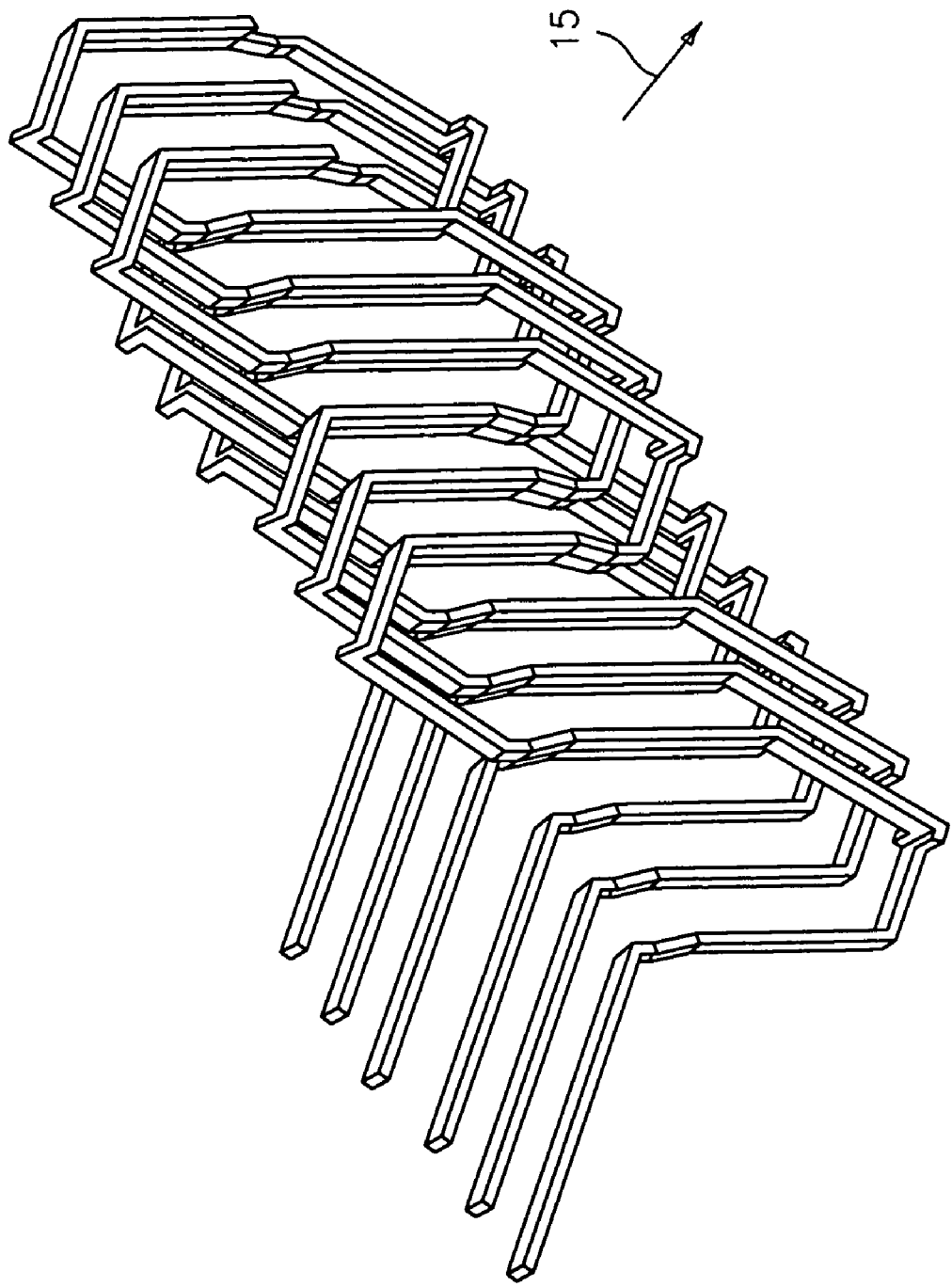
FIG. 11 is a schematic view of conductors nested in a prior art cascade winding pattern.

Referring to FIG. 11, a cascade style winding pattern is illustrated. While the illustrated style is itself known in the art, it is not know in combination with the stator core slot configuration taught herein.

Figure 12A:
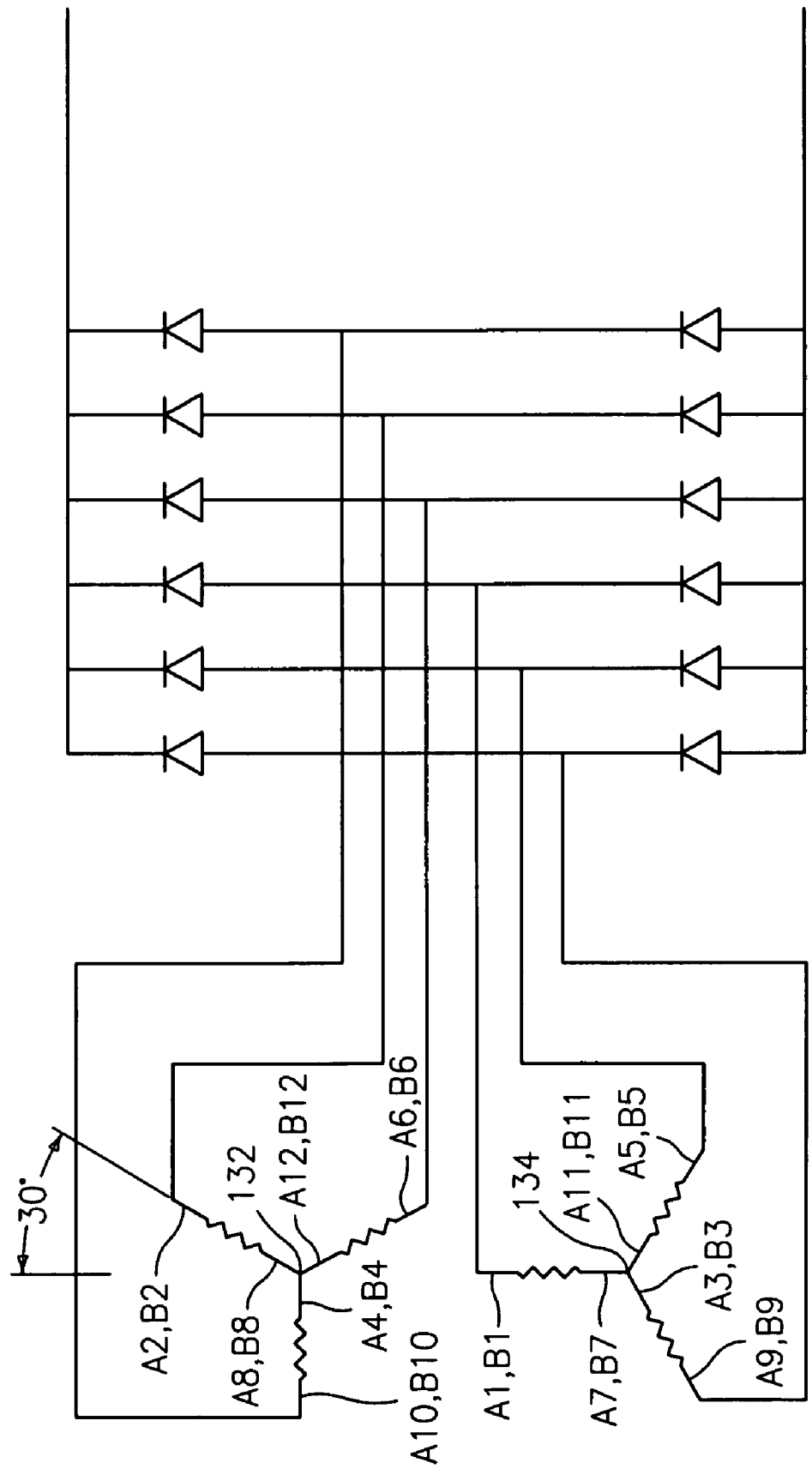
FIG. 12A is a schematic view of a dual wye winding.
Figure 12B:
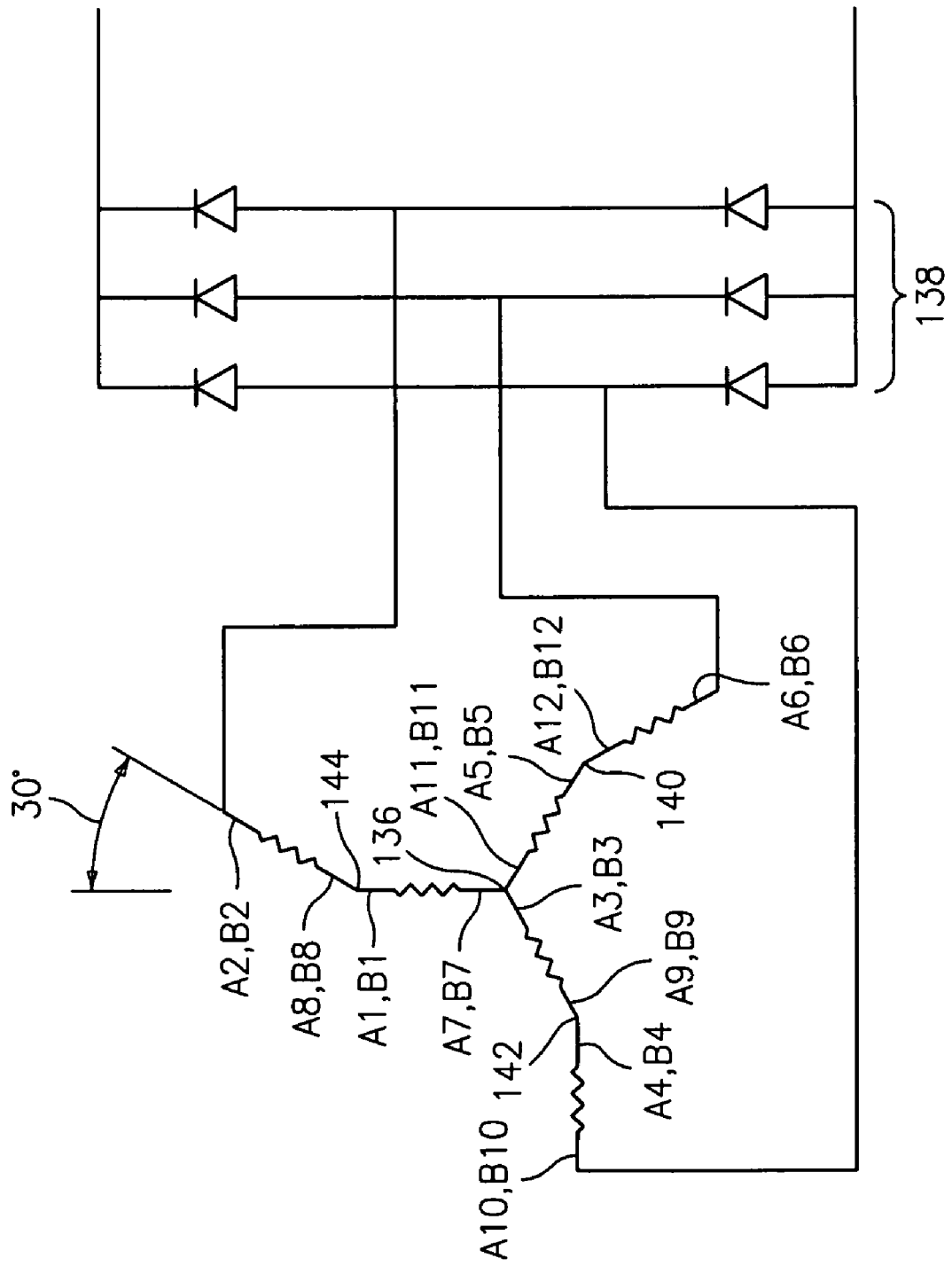
FIG. 12B is a schematic view of a three phase wye winding.

In view of the unconventionality of the foregoing teaching regarding the configuration and windings of a stator core, it is prudent to include schematic wiring diagrams to ensure complete understanding by a reader. With reference to FIGS. 12A and 12B, a dual wye and a 3-phase distributed wye diagram are illustrated. In FIG. 12A, each leg of the wye is connected in parallel, for example, A2 and B2 are connected to each other and also to a diode pair 130 as shown. Connections are likewise for each other pair of diode end leads of each conductor. In addition, each leg of the wye is connected at the neutral point 132 or 134 respectively. As can be seen in FIG. 12A, one wye winding is shifted by approximately 30 degrees with respect to the other wye winding. Returning to FIG. 12B, the 3-phase wye uses a single neutral point 136 and only three diode pairs 138. Additional conductor lead connections are connected in parallel at each node 140, 142 and 144 as illustrated. As can be seen in FIG. 12B, each phase is comprised of two portions wherein one portion is shifted approximately 30 degrees from the other portion.

The invention claimed is:

1. An automotive alternator comprising:
   a rotor having a plurality of poles;
   a plurality of phases in operable communication with said rotor;
   a stator core in operable communication with said rotor, said stator receiving said phases and having a number of slots defined by:

$$S=(P \times PH)+((M \times PH)+N)$$

where S=number of slots
   P=number of poles
   PH=number of phases
   M=a whole integer greater than or equal to 0
   N=a whole integer selected from a group of integers ranging from, and including, 1 through the number of phases minus 1.

2. An automotive alternator as claimed in claim 1 wherein said machine further comprises a plurality of conductors having:
   a plurality of slot segments
   a plurality of endloops, each electrically connecting a pair of adjacent slot segments;
   one or more skip-endloops each electrically connecting a pair of adjacent slot segments, the skip-endloops positioning the connected adjacent slot segments farther apart than slot segments connected by the endloops.

3. An automotive alternator as claimed in claim 2 wherein said skip-endloops leave selected stator slots unpopulated by slot segments of a particular conductor.

4. An automotive alternator as claimed in claim 3 wherein said unpopulated slots number two per winding pass.

5. An automotive alternator as claimed in claim 2 wherein said plurality of conductors are identical to each other for conductors utilized in a single pass.

6. An automotive alternator as claimed in claim 5 wherein said second pass of conductors is distinct form a first pass of conductors.

7. An automotive alternator as claimed in claim 5 wherein said second pass of conductors is identical to a first pass of conductors.

8. An automotive alternator as claimed in claim 7 wherein said first pass and second pass of identical conductors alternate with at least one distinct pass of conductors.

9. An automotive alternator as claimed in claim 1 wherein said M=0.

10. An automotive alternator as claimed in claim 1 wherein said plurality of phases equals six.

11. An automotive alternator as claimed in claim 1 wherein said stator includes at least a first wye winding and a second wye winding and said second wye winding is shifted a selected number of electrical degrees with respect to said first wye winding.

12. An automotive alternator as claimed in claim 1 wherein said stator includes at least a first 3-phase winding, each phase having a first portion and a second portion, the second portion being shifted a selected number of electrical degrees with respect to said first delta winding.

13. An automotive alternator as claimed in claim 1 wherein at least one of said phases includes two consecutive endloops connecting a first, second and third slot segment wherein said first, second and third slot segments are disposed at substantially the same radial distance from the central axis of said core.

14. An automotive alternator as claimed in claim 1 wherein at least one of said phases includes an endloop connecting a first and second slot segments wherein said first and second slot segments are disposed at substantially the same radial distance from a central axis of said stator core.

15. An automotive alternator as claimed in claim 1 wherein said plurality of phases equals three and the number of said slots is greater than two times the number of phases times the number of poles.

16. An automotive alternator comprising;
   a stator;
   a rotor in operable communication with the stator;
   at least one conductor having a plurality of endloops and a plurality of slot segments;
   an unusual number of slots formed in said stator, said slots including at least one slot populated by a number of slot segments different than a number of slot segments populating another of said slots.

17. An automotive alternator as claimed in claim 16 wherein each one of said slots is populated by at least one of said slot segments.

18. An automotive alternator as claimed in claim 16 wherein at least one of said slots is empty.

19. An automotive alternator as claimed in claim 16 wherein said plurality of phases equals six.

20. An automotive alternator as claimed in claim 16 wherein said plurality of phases equals three and the number of said slots is greater than two times the number of phases times the number of poles.

21. An automotive alternator as claimed in claim 16 wherein said stator includes at least a first wye winding and a second wye winding and said second wye winding is shifted by a selected number of electrical degrees with respect to said first wye winding.

22. An automotive alternator as claimed in claim 16 wherein said stator includes at least a first 3-phase winding, each phase having a first potion and a second portion, the second portion being—shifted by a selected number of electrical degrees with respect to said first portion.

23. An automotive alternator as claimed in claim 16 wherein at least one of said phases includes two consecutive endloops connecting a first, second and third slot segment wherein said first, second and third slot segments are disposed at substantially the same radial distance from the central axis of said core.

24. An automotive alternator as claimed in claim 16 wherein at least one of said phases includes an endloop connecting a first and second slot segments wherein said first and second slot segments are disposed at substantially the same radial distance from a central axis of said stator core.

25. An automotive alternator as claimed in claim 16 wherein
   at least one of said conductors includes at least two consecutive endloops and at least one skip-endloop, wherein said skip-endloop positions the connected adjacent slot segments farther apart than slot segments connected by the endloops.

26. An automotive alternator as claimed in claim 25 wherein at least one of said conductors includes at least four consecutive endloops.

27. An automotive alternator as claimed in claim 25 wherein said two consecutive endloops and the slot segment located between said two consecutive endloops, are all formed from one continuous conductor.

28. A method for reducing magnetic noise in an automotive alternator comprising:
   selecting a number of poles;
   selecting a number of phases; and
   selecting a number of stator core slots, the foregoing selections interacting in the automotive alternator to produce an order of frequency of a tangential force different than any multiple of the number of phases and different than an order of frequency of a radial force of the alternator.

* * * * *